(12) United States Patent
Aziz et al.

(10) Patent No.: US 12,235,994 B2
(45) Date of Patent: **\*Feb. 25, 2025**

(54) SYSTEM AND METHOD FOR EXTERNAL USERS IN GROUPS OF A MULTITENANT SYSTEM

(71) Applicant: OPEN TEXT SA ULC, Halifax (CA)

(72) Inventors: Kyle Anthony Aziz, Kitchener (CA); Scott Grasley, Kitchener (CA); Feng Guo, Waterloo (CA)

(73) Assignee: OPEN TEXT SA ULC, Halifax (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 18/310,528

(22) Filed: May 1, 2023

(65) Prior Publication Data
US 2023/0274027 A1 Aug. 31, 2023

Related U.S. Application Data

(63) Continuation of application No. 17/097,642, filed on Nov. 13, 2020, now Pat. No. 11,675,927.

(60) Provisional application No. 62/934,841, filed on Nov. 13, 2019.

(51) Int. Cl.
*G06F 21/62* (2013.01)
*H04L 9/40* (2022.01)

(52) U.S. Cl.
CPC ........ *G06F 21/6245* (2013.01); *H04L 63/101* (2013.01); *H04L 63/104* (2013.01)

(58) Field of Classification Search
CPC .. G06F 21/6245; H04L 63/101; H04L 63/104
See application file for complete search history.

(56) References Cited

U.S. PATENT DOCUMENTS

| | | | |
|---|---|---|---|
| 9,774,586 B1 * | 9/2017 | Roche | H04L 63/08 |
| 10,878,115 B1 * | 12/2020 | Meriaux | G06F 21/6218 |
| 2010/0306775 A1 * | 12/2010 | Appiah | G06F 9/468 718/100 |
| 2016/0337365 A1 * | 11/2016 | Beiter | H04L 63/101 |
| 2020/0097233 A1 * | 3/2020 | Ueda | H04L 63/10 |
| 2021/0136083 A1 * | 5/2021 | Gordon | H04L 63/104 |

\* cited by examiner

*Primary Examiner* — Phy Anh T Vu
(74) *Attorney, Agent, or Firm* — Sprinkle IP Law Group

(57) ABSTRACT

Content management systems are implemented according to a multitenant architecture by which software and its supporting architecture serves multiple customers of a service. Each tenant may be given a share of the application's data, configuration, user management, and other aspects of the application. Each tenant's data is isolated and typically remains invisible to other tenants so that tenants do not share or see each other's data. Embodiments described herein provide mechanisms by which a tenant can delegate administrator rights to an external user such that the external user can grant other users access to the tenant's content while the tenant controls the level of access that is provided to the external users.

20 Claims, 12 Drawing Sheets

FIG. 3C

SYSTEM AND METHOD FOR EXTERNAL USERS IN GROUPS OF A MULTITENANT SYSTEM

CROSS-REFERENCE TO RELATED APPLICATIONS

This application is a continuation of, and claims a benefit of priority under 35 U.S.C. § 120 from, U.S. patent application Ser. No. 17/097,642, filed Nov. 13, 2020, issued as U.S. Pat. No. 11,675,927, entitled "SYSTEM AND METHOD FOR EXTERNAL USERS IN GROUPS OF A MULTITENANT SYSTEM," which claims a benefit of priority under 35 U.S.C. § 119 (e) from U.S. Provisional Application No. 62/934,841, filed Nov. 13, 2019, entitled "SYSTEM AND METHOD FOR EXTERNAL USERS IN GROUPS OF A MULTITENANT SYSTEM," both of which are fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to the field of content management. More specifically, the disclosure relates to a system and method to enable users to delegate group administrative privileges to external users.

BACKGROUND

An emerging information technology (IT) delivery model is web services model, by which shared resources, software or information are provided over a network such as the Internet to computers and other devices on-demand. In many cases such web services are provided in the context of cloud computing. A cloud computing service generally refers to a service that allows end recipient computer systems (thin clients, portable computers, smartphones, desktop computers and so forth) to access a pool of hosted computing or storage resources (i.e., the cloud resources) over a network (the Internet, for example). In this manner, the host, a cloud service, may, as examples, provide: Software as a Service (SaaS) by hosting applications; Infrastructure as a Service (IaaS) by hosting equipment (servers, storage components, network components, etc.); or a Platform as a Service (PaaS) by hosting a computing platform (operating system, hardware, storage, etc.).

Cloud computing and web services are often implemented according to a multitenant architecture by which software and its supporting architecture serves multiple customers of a service. Each tenant may be given a share of the application's data, configuration, user management, and other aspects of the application. Each tenant's data is isolated and typically remains invisible to other tenants so that tenants do not share or see each other's data.

Organizations are increasingly using multitenant content management services to facilitate content management in conjunction with distributed access to content. Such services often provide cloud storage, access controls and tools to share and collaborate on files. One useful feature of some multitenant content management systems is the ability for a tenant to share files with users outside of the tenant. For example, a tenant may be provided with the capability to add individual external users as collaborators on a folder or file and assign permissions to the external users for the folder or file thereby allowing the external users to access the folder or file in accordance with their permissions.

The mechanisms provided by multitenant content management systems for sharing with external users prove problematic in many practical situations in part because a tenant may not know the identities of all the individuals with whom content is to be shared. To provide an example, a manufacturer sharing its internal service manuals with service specialists of a repair contractor may not know to add or remove specialists when personnel are hired or terminated by the repair contractor, resulting in some service specialists not having access to the service manuals when needed and other individuals retaining access when they should no longer have access.

What is needed, therefore, is a new implementation for delegation of administrative privileges that affect access to shared content.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3A, FIG. 3B and FIG. 3C illustrate an example of a content management service User Group user interface.

DETAILED DESCRIPTION

The invention and the various features and advantageous details thereof are explained more fully with reference to the non-limiting embodiments that are illustrated in the accompanying drawings and detailed in the following description.

Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Embodiments described herein provide mechanisms by which users who are not part of a tenant can get access to content within that tenant. The tenant can delegate administrator rights to an external user such that the external user can grant other users access to the tenant's content while the tenant controls the level of access that is provided to the external users.

Figure 1:
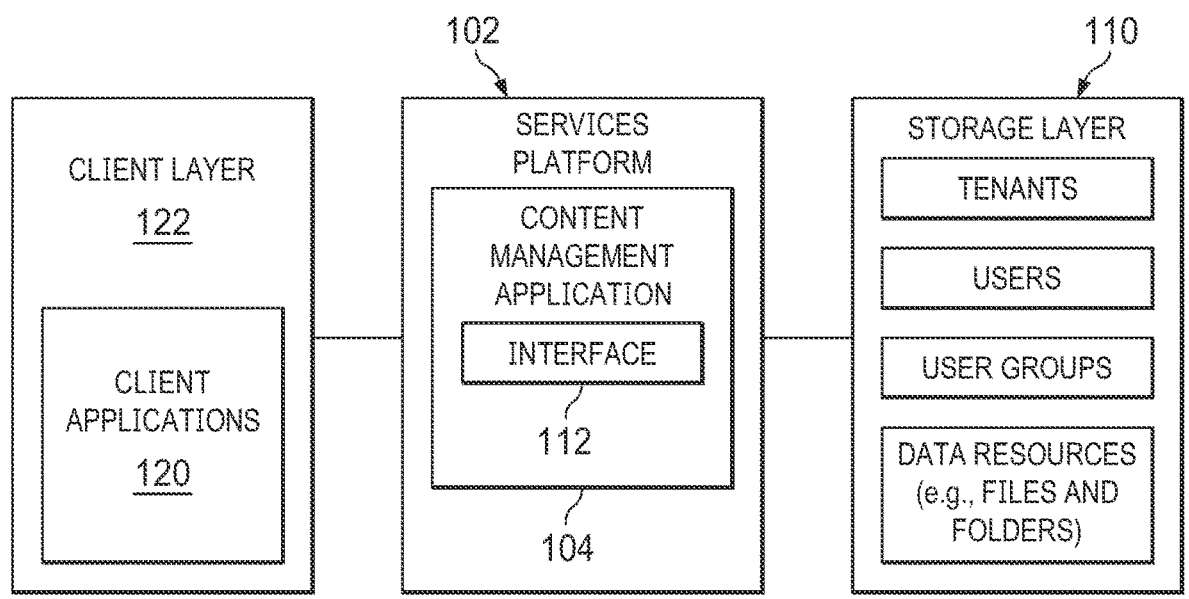
FIG. 1 is a block diagram depicting one embodiment of an environment in which a multitenant content management system with support of external users in groups can be implemented.

FIG. 1 is a diagrammatic representation of one embodiment of an architecture for a multitenant content management service. In one embodiment, the multitenant content management service is deployed on a cloud platform. Here, a services platform 102 provides a content management application 104 that may be accessed through an interface 112, which may be a Representational State Transfer (REST) or other interface. Services platform 102 may be implemented on a server or servers, including, but not limited to, on servers of a cloud computing platform. According to one embodiment, services platform 102 is a web services platform and content management application 104 is a web application.

Various client applications 120 (usually remote) in a client layer 122 may request services offered by content management application 104 using the interface 112 offered by the content management application 104. In some cases, these client applications 120 may be proprietary client applications executing on a user client's computing device associated with, or provided by, the provider of the content management application 104 or may be browser-based interfaces provided by the provider of the content management application 104. For example, a user at a client device may access a certain location (e.g., Universal Resource Locator (URL)) associated with the content management application 104 using a browser and a browser-based application for accessing the content management application 104 may be provided.

As the user interacts with a client application 120, requests for various services provided by the services platform 102 may be sent by the client application 120, received through the interface 112, and the content management application 104 may take appropriate actions. Client devices may access content from content management application 104 over a network, which may be a LAN, WAN, such as the Internet, or other network. Client devices may include a variety of device types including, but not limited to, personal computers, workstations, smart phones, laptop computers, or other computer devices operable to access data from services platform 102. It should be understood that a system may include any number of servers and clients.

In many cases, the content management application 104 requires data storage and management to implement the functionality of the platform. Accordingly, services platform 102 may include, or access a storage layer 110 used for such data storage and data management. This storage layer may include one or more databases, one or more filesystems, a combination thereof or other storage.

According to one embodiment, content management application 104 supports multitenancy. Each tenant is a defined entity in content management application 104 and has a unique tenant ID. A tenant defines a grouping of users. For example, tenants may correspond to organizations that are customers of a content management service provider where each tenant holds user accounts for employees or agents of the corresponding organization. Moreover, in some embodiments, individuals may subscribe for personal accounts. For example, a content management service may offer a free tier of accounts available to the general public. In one embodiment, users associated with personal accounts are not affiliated with a tenant. In another embodiment, users associated with personal accounts are associated with a system tenant. For example, according to one embodiment, the content management application 104 maintains a special tenant of its own tier, referred to herein as the "Public tenant." Content management application 104 can isolate users under the Public tenant from each other. Effectively, the Public tenant holds all free user accounts. In another embodiment, free user accounts are established under a set of Public tenants (e.g., a Public tenant is defined for each free account or Public tenants are established for groups of free user accounts). According to one embodiment, users of free accounts that exist within a Public tenant do not have access to management of the Public tenant.

Each tenant can have associated users, user groups, and data resources, which may be managed as objects. Data storage layer 110 may thus provide an object-based data store to store managed objects. As will be appreciated, users, user groups and data resources are segregated by tenant. Users can be assigned roles and privileges with respect to user groups and data resources and user groups can be assigned roles and privileges with respect to data resources. According to one embodiment, roles and associated privileges assigned to roles are defined at a system level. In addition, or in the alternative, roles and associated privileges may be defined on a per-tenant basis.

The data resources of a tenant include files and folders managed as objects. Managed folders may be "virtual" folders that do not correspond to actual file directory paths in a file system of storage layer 110. The files managed by content management application 104 are stored in a file system of data storage layer 110, a database (e.g., as blobs), or as sets of logically related data managed as file objects.

In one embodiment, each file and folder managed by content management application 104 is associated with content management metadata. The content management metadata may include an object identifier associated with each item managed by the content management application 104. In particular, in order to manage content in the content management system (e.g., as stored in storage layer 110) the content management application 104 may utilize one or more object identifiers, such as GUIDs to identify objects. Accordingly, content management metadata may include metadata associated with a managed object. Content management metadata may contain enough information that the content management application 104 will be able to, for example, locate the managed object in storage layer 110 even in cases where the managed object has changed location on the file system or determine if an object is a latest or same version of that object, or perform other operations with respect to managed objects.

Content management application 104 provides a content navigation structure in which resources are arranged in identifiable containers. The content navigation structure may, for example, be visualized as a hierarchical tree structure in which nodes in the tree correspond to files and folders arranged based on parent-child relationships defined in the file and folder objects. The content navigation structure may or may not reflect an actual arrangement of files and folders in a file system of storage layer 110.

Content management application 104 provides user interface functionality for accessing items managed by content management application 104. The interface functionality may be provided through any suitable mechanism including, but not limited to, a web application server exposing a REST API or through another mechanism. Content management application 104 processes requests (e.g., commands) submitted via the interface by client applications running on client devices to enable users to perform various operations via a client application, such as uploading items, downloading items, reserving items, editing content, searching, adding items to containers, removing items from containers, adding containers, editing containers, removing containers and other operations. A user's ability to access particular items and perform particular operations is limited based, for example, on permissions.

Content management application 104 provides the capability for a member of a tenant (i.e., a user who belongs to the tenant) to define users groups that include external users to allow the external users to access specified content of the tenant. Content management application 104 further provides the capability for a member of a tenant to designate an external user as a group administrator for the user group. As such, and external user can be delegated administrative privileges to add and remove users, including other external users, to/from the external user group to change which users have access to the specified content.

According to one embodiment, content management application 104 receives a definition of a user group from a member of a tenant. The definition of the user group can include, for example, a name of the user group, a description of the user group, an indication of a group administrator for the user group and an indication of the members of the user group. The group administrator and members of the user group can be internal users of the tenant or external users (users who are not members of the tenant). In some embodiments, a user is limited to selecting only registered users of the content management service as a user group administrator or member. In other embodiments, a user may select potential users (such as by email address) and content management application can contact the users (e.g., via email) to have them register for an account.

Content management application 104 updates storage layer 110 according to the user group definition. For example, content management application can create a user group object, assign the user group object a group id and update a data structure (e.g., a table or tables) with the user group object, the user group object can indicate the group administrator(s) and member(s). The content management application 104 associates the user group object with the tenant id. In some embodiments, content management application 104 updates user objects representing users to indicate that the corresponding users are members of the user group.

Content management application 104 further receives a share definition. The share definition includes an indication of a file or folder to be shared with the user group and a level of access for the file or folder. Based on the share definition, content management application sets permissions for the user group on the file or folder. This may include, for example, updating a file or folder object in the database. Content management application 104 may also update the user group object to reference the file or folder. Files and folders below a folder on which permissions are set for a user group may inherit the permissions for the user group.

When a user interacts with the content management service, content management application 104 can determine if the user is a member of the user group. If the user is a member of the user group, content management application 104 allows the user to access the file or folder according to at least level the level of access specified for the user group to that file or folder. If the user is not a member of the user group, content management application 104 blocks access by the user to the file or folder or provides access to the file or folder according to a level of access provided to the user through another mechanism (e.g., membership in another user group, assignment of access specifically to the user).

Content management application 104 further determines if the user is a group administrator of the user group. If the user is a group administrator of the user group, content management application 104 allows the user to perform administrator functions on the user group, such as adding and removing members or other administrator functions, and updates the user group object accordingly. If the user is not a group administrator of the user group, content management application prevents the user from performing the administrative functions on the user group.

FIGS. 2-10 illustrate one example of defining, using and administering user groups with external tenants. For the sake of the examples below, it is assumed that the content management application 104 has at least two tenants, a first tenant, CompanyA, and a second tenant, CompanyB. The content management application 104 may also have a number of users who are unaffiliated with a tenant or are associated with a special tenant (e.g., a Public tenant).

Figure 2:
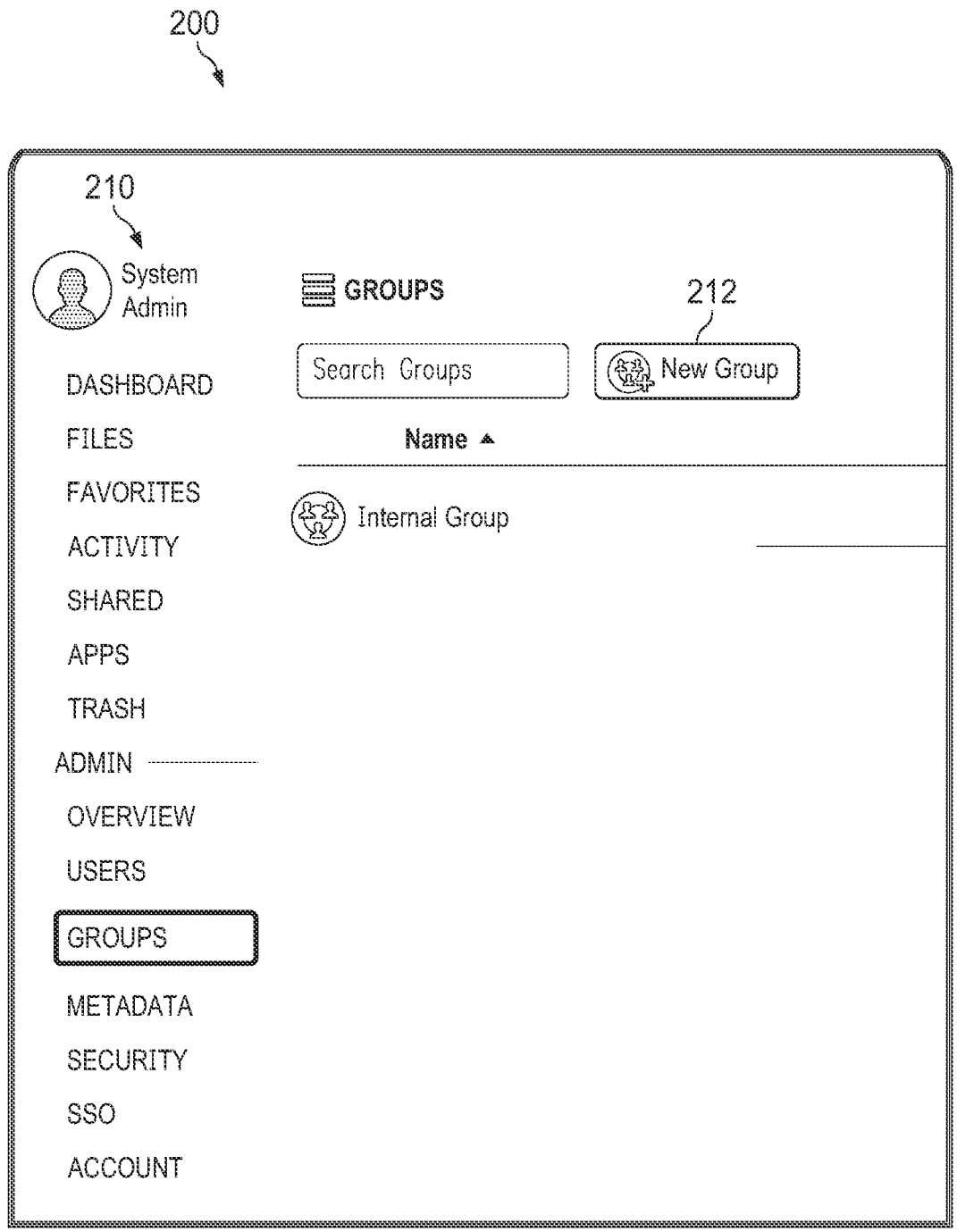
FIG. 2 illustrates an example of a content management service Groups user interface.

FIG. 2 illustrates an example of a content management service Groups user interface 200 (e.g., a portion of a web page) provided to a first user 210 (user System Admin) who is a member of a first tenant of the content management application. As will be appreciated, the options displayed in the user interface may depend on privileges granted to the user. In any case, the interface of FIG. 2 allows the first user 210 to view and create user groups for the first tenant. In FIG. 2 the user has selected to view the user groups defined for the first tenant. Responsive to the selection of a "New Group" control 212, the content management service provides an interface for defining a new user group associated with the first tenant.

Figure 3A:
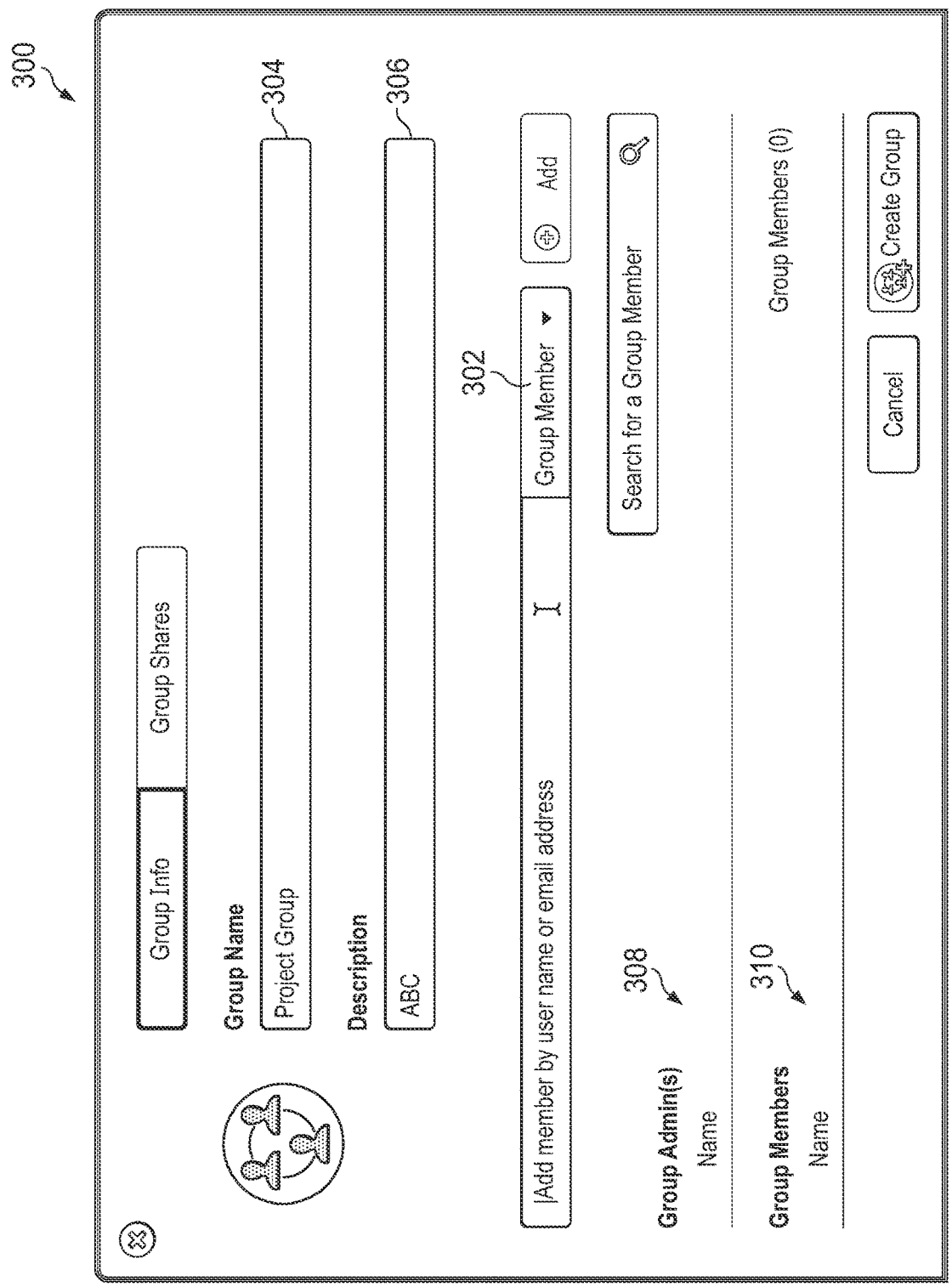
Figure 3B:
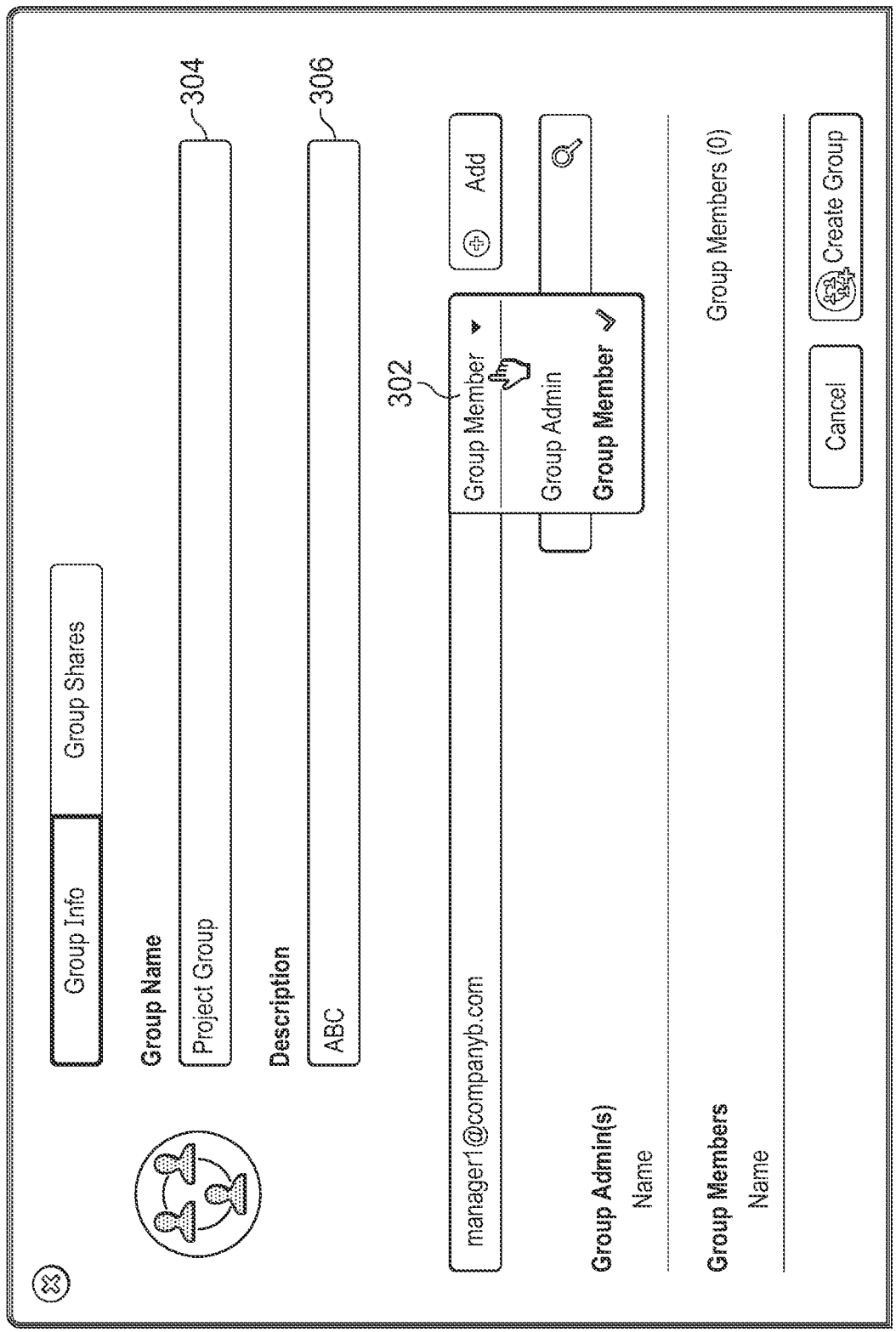

FIG. 3A and FIG. 3B illustrate an example of a content management service User Group user interface 300 (e.g., a portion of a web page) provided to the first user to allow the first user to define a new group. Here, the user can name the user group (field 304), provide a description of the user (field 306) and, at 302, add users to the user group. The user defining the new group can select internal users (that is, users who are members of the same tenant) or external users (that is users who are not members of the same tenant) as members of the new user group. The interface provides a control to allow the first to assign a role with respect to the user group to each user added to the group including, for example, Group Administrator 308 or Group Member 310. In one embodiment, a Group Administrator is automatically considered a Group Member as well.

Figure 3C:
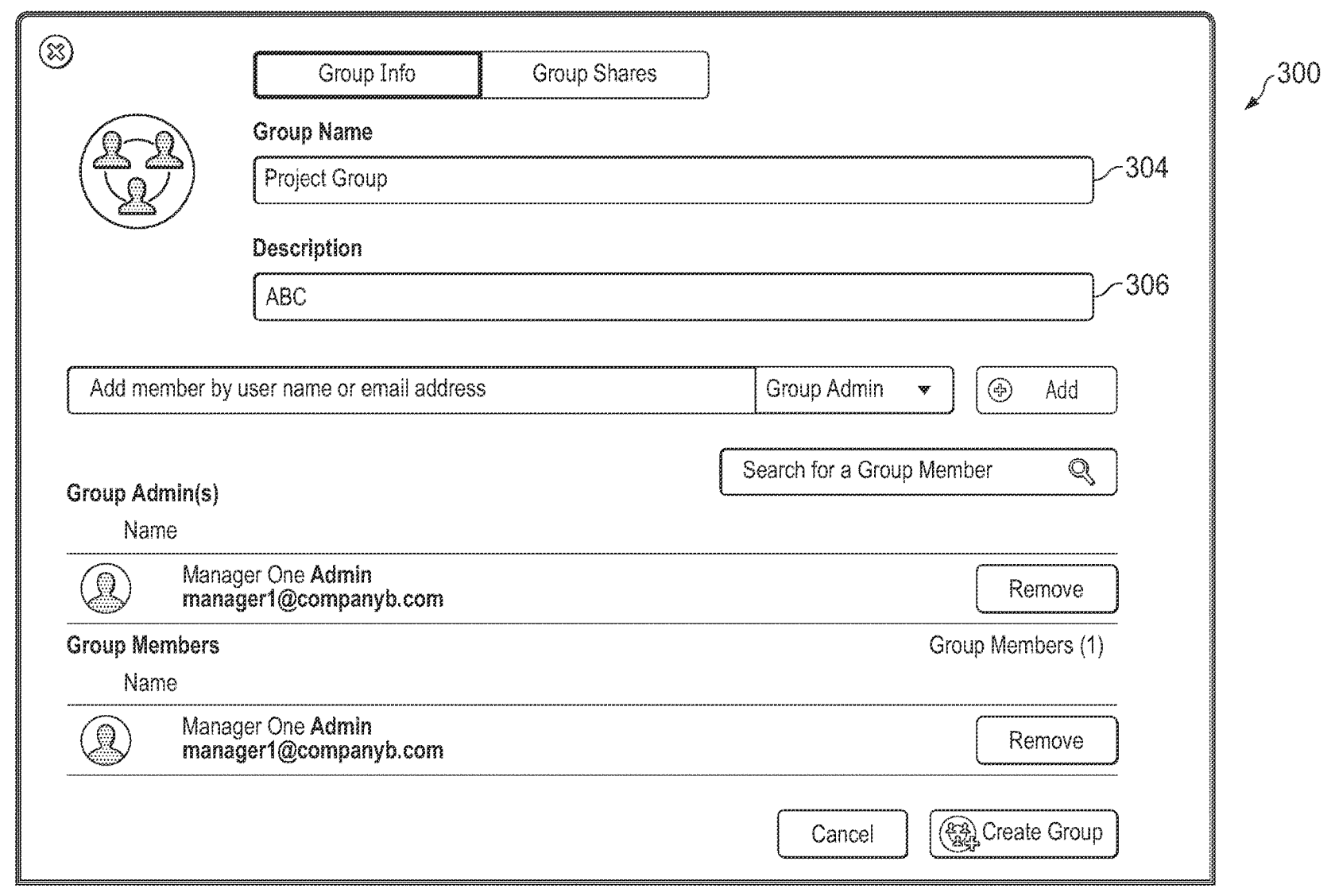

FIG. 3C illustrates an example of the content management service User Group user interface 300 (e.g., a portion of a web page) in which an external user (a user, Manager One, associated with the email address manager1@companyb.com) has been added as a Group Administrator and a Group Member to the Project Group user group. The user can add additional external and internal users to the user group. In some embodiments, an external user (e.g., a tenant of companyB), who has been added as an administrator, may be limited to only adding group members who are associated with the same tenant/email domain as the external user (e.g., user1@companyB.com can only add users having an email address @companyB.com).

According one embodiment, a user designated as only a Group Member does not have any administrative privileges with respect to the user group, whereas a user designated as a Group Administrator for the user group has privileges to add and remove group members to/from the user group. A Group Administrator may also have other privileges, such as the ability to delete the group. In other embodiments, additional or alternative roles are used.

According to one embodiment, the person who creates the group or (any member of the tenant for which the group is created who has sufficient privileges) may have more or different privileges compared to external user who is made a group administrator. For example, the System Admin, group creator, etc. may have rights to delete the group. Similarly, an external user who is made group administrator may have limited rights to administering the group. For example, an external user who is made group administrator may only have the right to add/remove other users.

Figure 4:
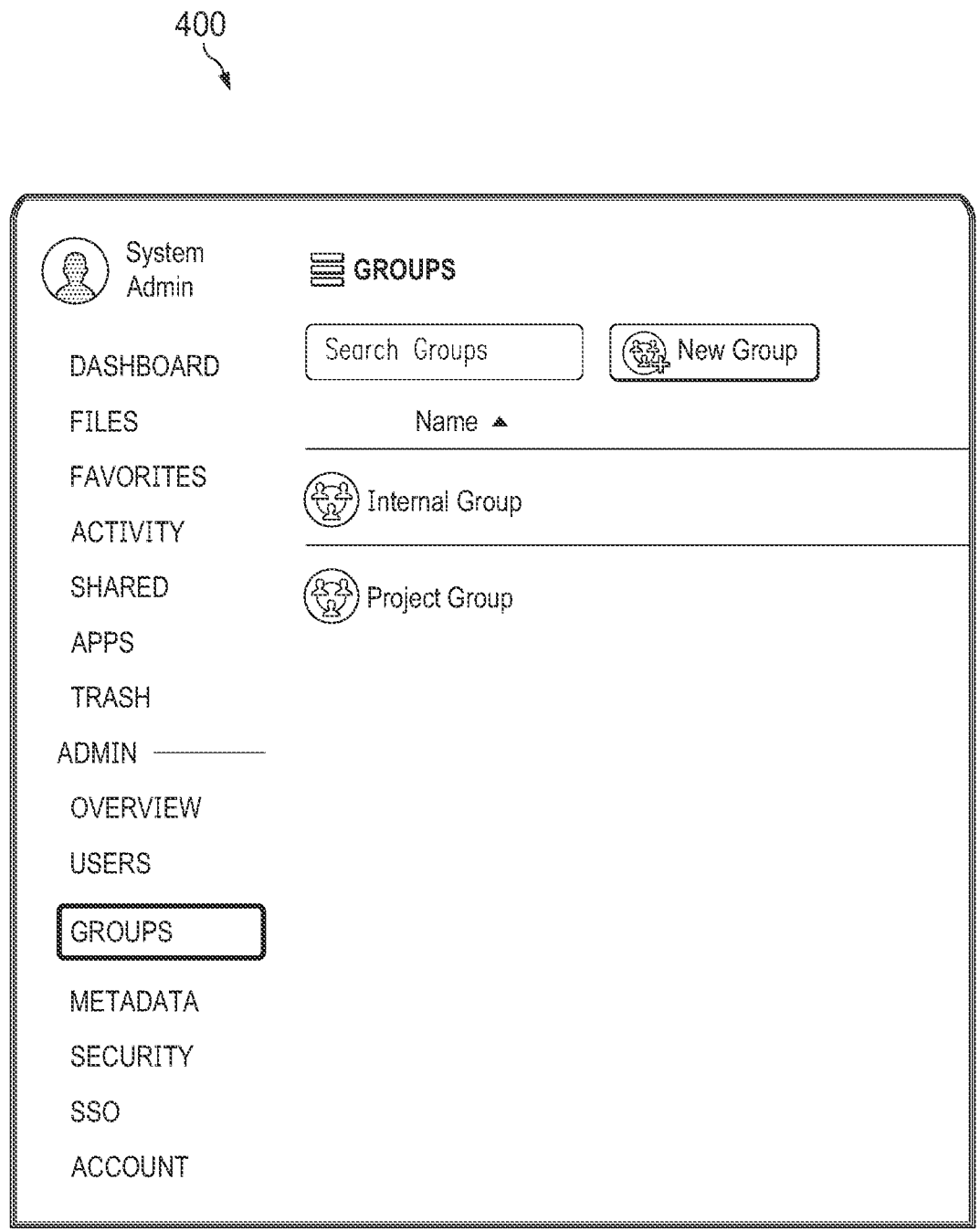
FIG. 4 illustrates another example of the content management service Groups user interface.

FIG. 4 illustrates an example of the content management service Groups user interface 400 provided to the first user after creation of Project Group.

Figure 5:
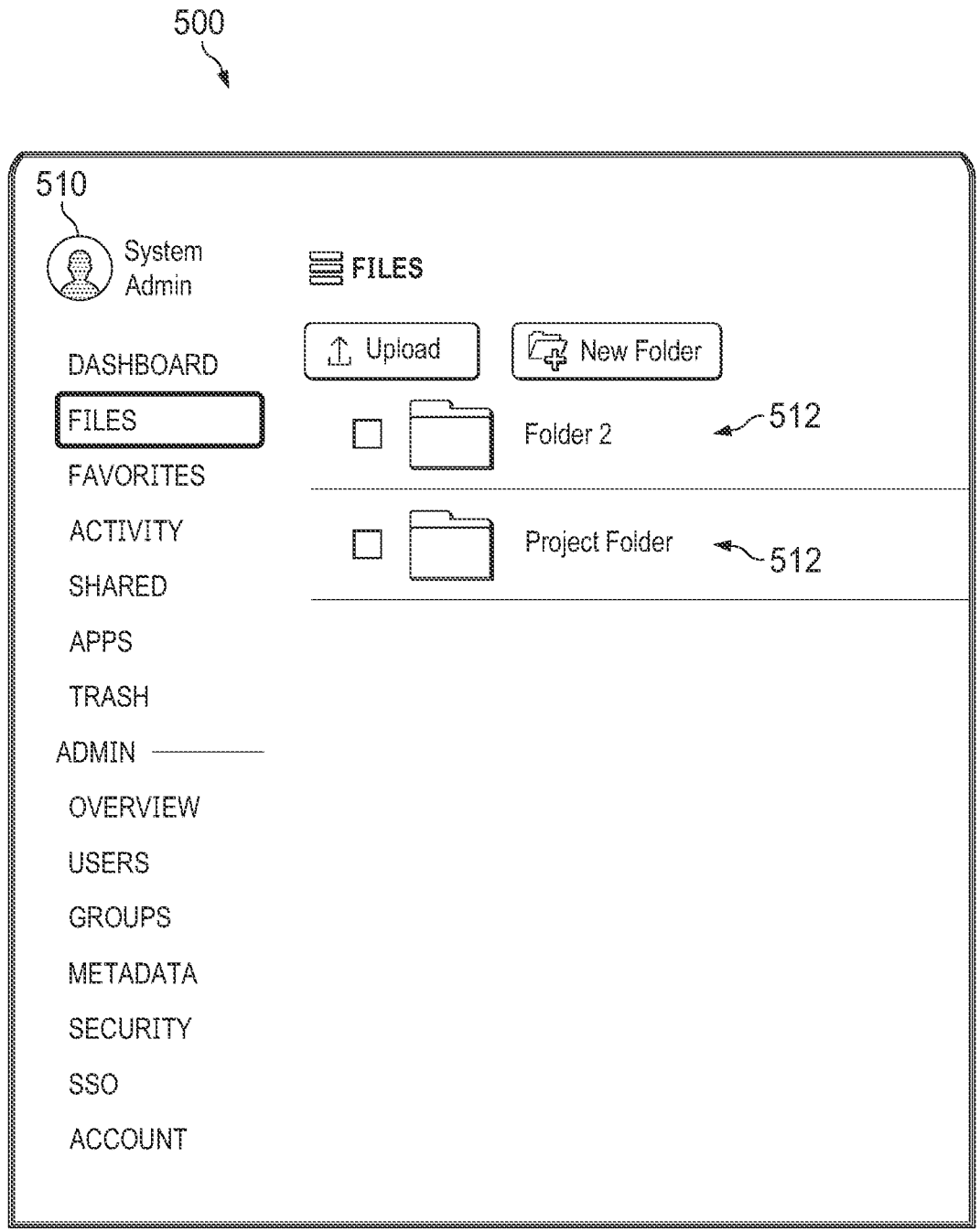
FIG. 5 illustrates one embodiment of a Files user interface.

FIG. 5 illustrates a Files user interface 500 presented by the content management application to the first user, System Admin 510. In this example, the user interface displays a set of folders 512 available to the first user. The displayed folders 512 correspond to a level of a content navigation hierarchy and can contain other folders and files. In this example, the first user is able to access Folder 2 and Project Folder.

The content management application can provide tools to allow a user to provide a share definition with respect to a file or folder. For example, the content management application can provide a user interface with tools to allow the user to designate a folder (or file) to be shared, the collaborators for the file or folder—that is, the users and user groups with which the folder (or file) is to be shared—and the level of access each user or user group has to the folder (or file).

Figure 6:
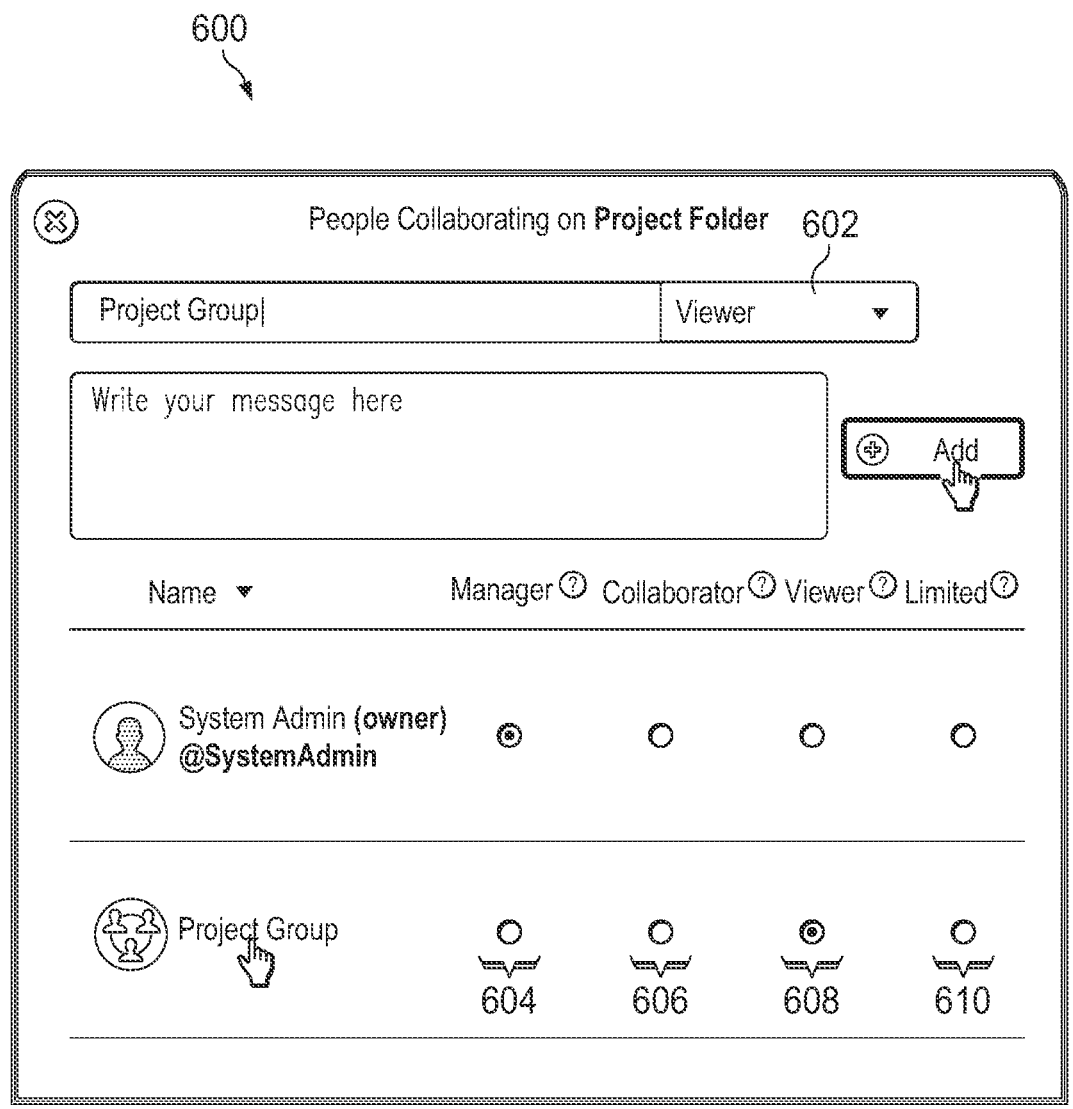
FIG. 6 illustrates one embodiment of a collaboration user interface.

FIG. 6 illustrates a collaboration user interface 600 presented by the content management service to the first user, System Admin, allowing the first user to share Project Folder with collaborators, including individual users (internal or external users) and user groups. The user interface 600 includes a control 602 to allow the user to add collaborators to the folder and assign each collaborator a role with respect to the folder, where each role has an associated level of access. In this example, the roles are "Manager," 604 "Collaborator," 606 "Viewer" 608 and "Limited" 610. In one embodiment, a Manager has broad permissions to, for example, add users to the folder, update share permissions, view, edit, move, copy, download, delete, add files and folders, promote versions. A Collaborator has permissions to view, edit, copy, download, and add files or folders. A Viewer has permissions to view, download and copy files and folders. A Limited user or user group has permission to view files or folders. Other roles and levels of access can be defined depending on implementation.

Here, the first user has selected to share Project Folder with the Project Group and has assigned the Project Group a Viewer level of access to the Project Folder. Thus, each member of the Project Group will have a Viewer level of access to Project Folder. In some embodiments, the permissions for a user or user group set for a folder are inherited by folders and files below the folder in a content hierarchy.

Thus, Manager One, who is a member of Project Group, has a Viewer level of privilege with respect to Project Folder and a Group Administrator level of privilege with respect to Project Group. In this example then, Manager One cannot directly add collaborators to the Project Folder of the first tenant, cannot delete Project Folder, etc. However, Manager One can add users to Project Group, thus effectively providing additional users with a Viewer level of access to Project Folder.

When a user logs in to the content management service or at the occurrence of other predefined events (e.g., requests from the client application), the content management application determines the folders and files to which the user has access. This includes determining user groups of which the user is a member or administrator and the folders and files to which those groups have access. Further, the content management application determines if the user is designated as a "Group Administrator" for a user group. This information is used to provide appropriate user interfaces to the user.

Figure 7:
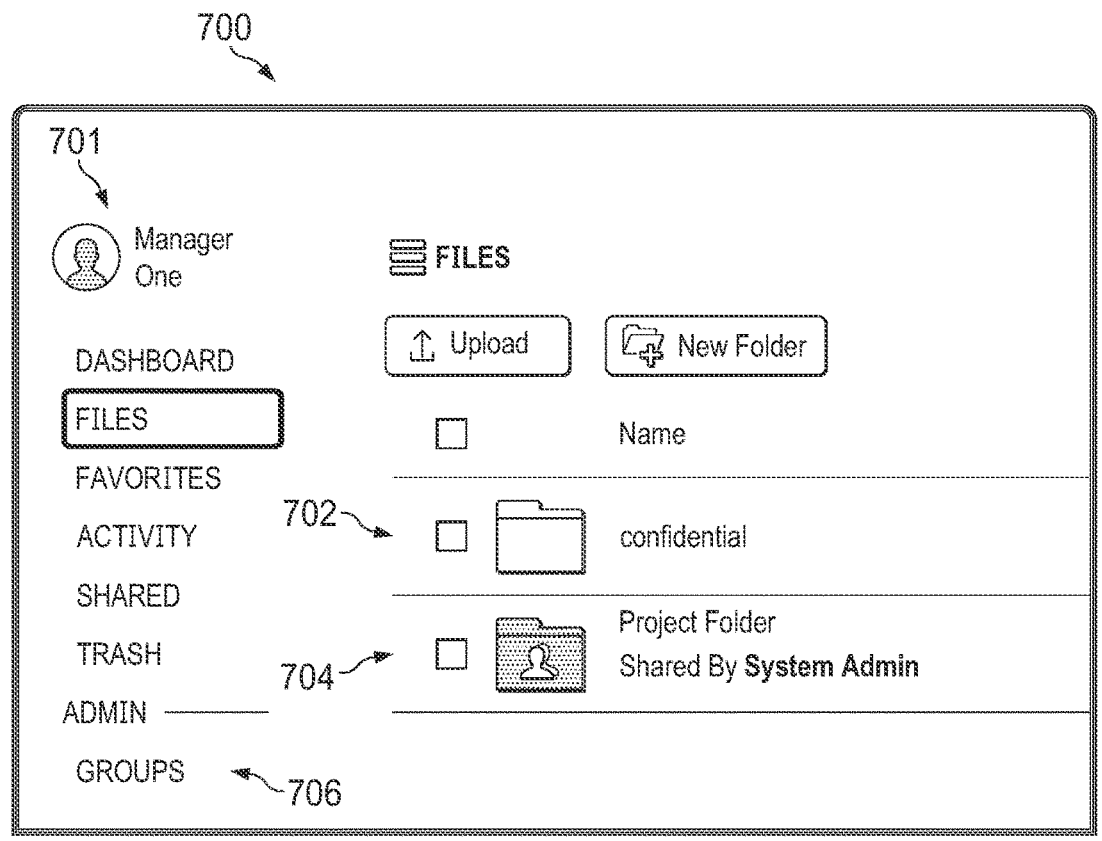
FIG. 7 illustrates another embodiment of a Files user interface.

FIG. 7 illustrates one embodiment of a Files user interface 700 provided by a content management application to a second user, Manager One 701, who is a member of a second tenant. In this example, Manager One can access a Confidential folder 702, which Manager One owns, and Project Folder 704 of the first tenant, where the project folder was shared with Project Group of which Manager One is a member. Confidential 702 and Project Folder 704 may contain folders and files that Manager One can also access. In this example, Manager One can access Project Folder (and subfolders and files) according to permissions associated with a Viewer level of access based on System Admin of the first tenant assigning Project Group a Viewer level of access to Project Folder (see, FIG. 6).

The user interface provided to Manager One may include some administrative options, including a Groups administrative option 706 to administer groups for which Manager One is designated as a group administrator. The presentation of the Groups administrative option to Manager One based on the fact that Manager One was designated as a Group Administrator for Project Group.

Figure 8:
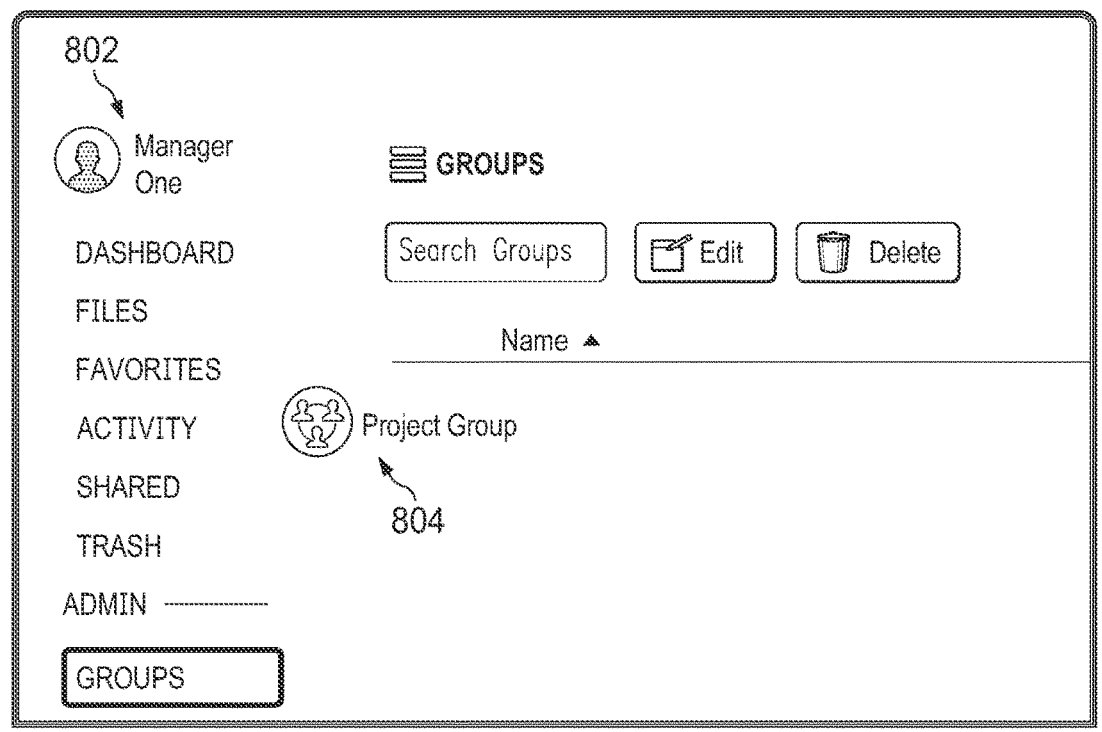
FIG. 8 illustrates another embodiment of a content management service Groups user interface.

FIG. 8 illustrates an example of a content management service Groups user interface 800 (e.g., a portion of a web page) provided to Manager One 802, who is a member of the second tenant, illustrating the user group defined within the context of the first tenant. The user interface 800 provides options for the user to search groups that he or she can administer, edit existing groups or delete groups.

Figure 9:
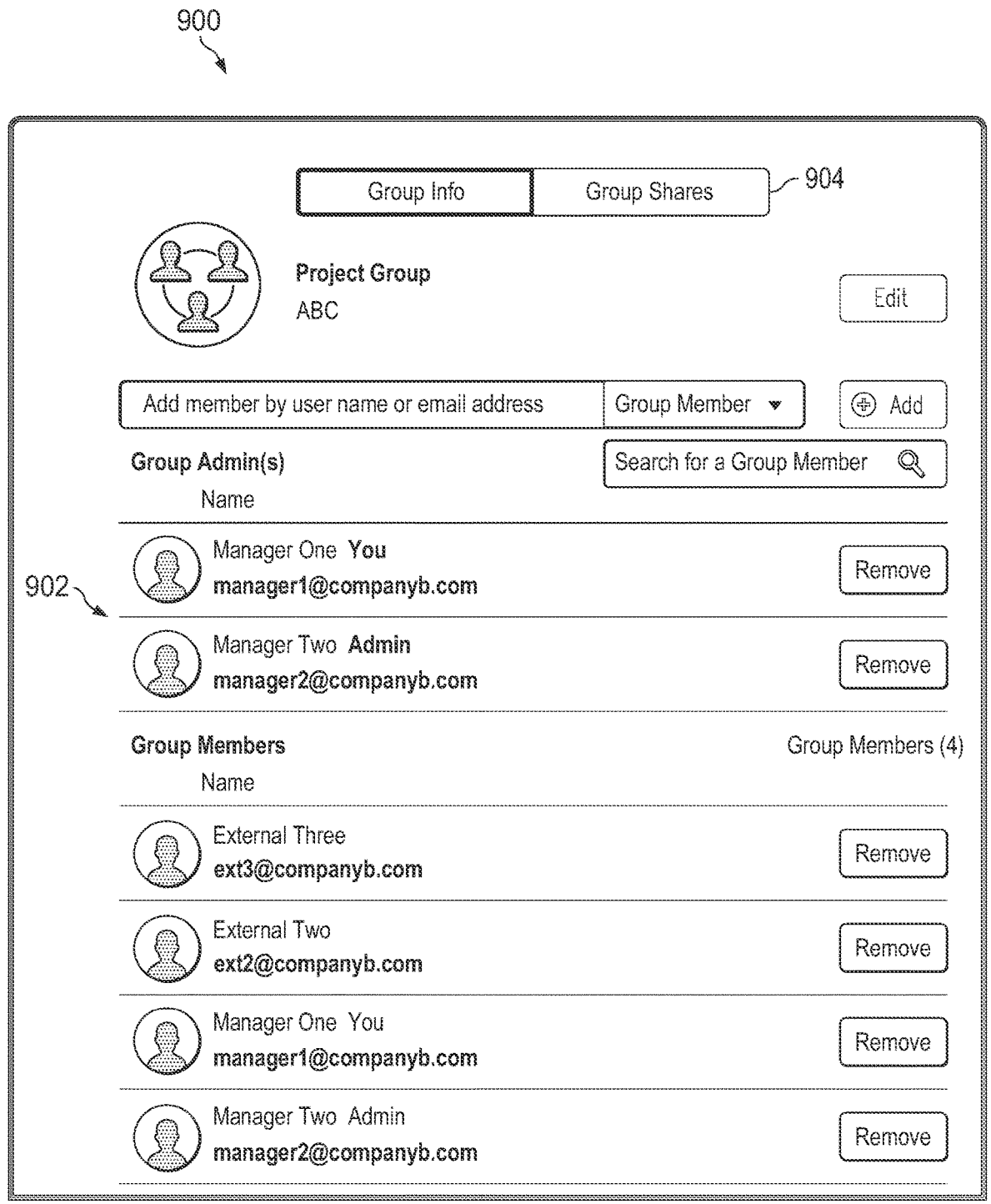
FIG. 9 illustrates one embodiment of a content management service Group Administration interface.
Figure 10:
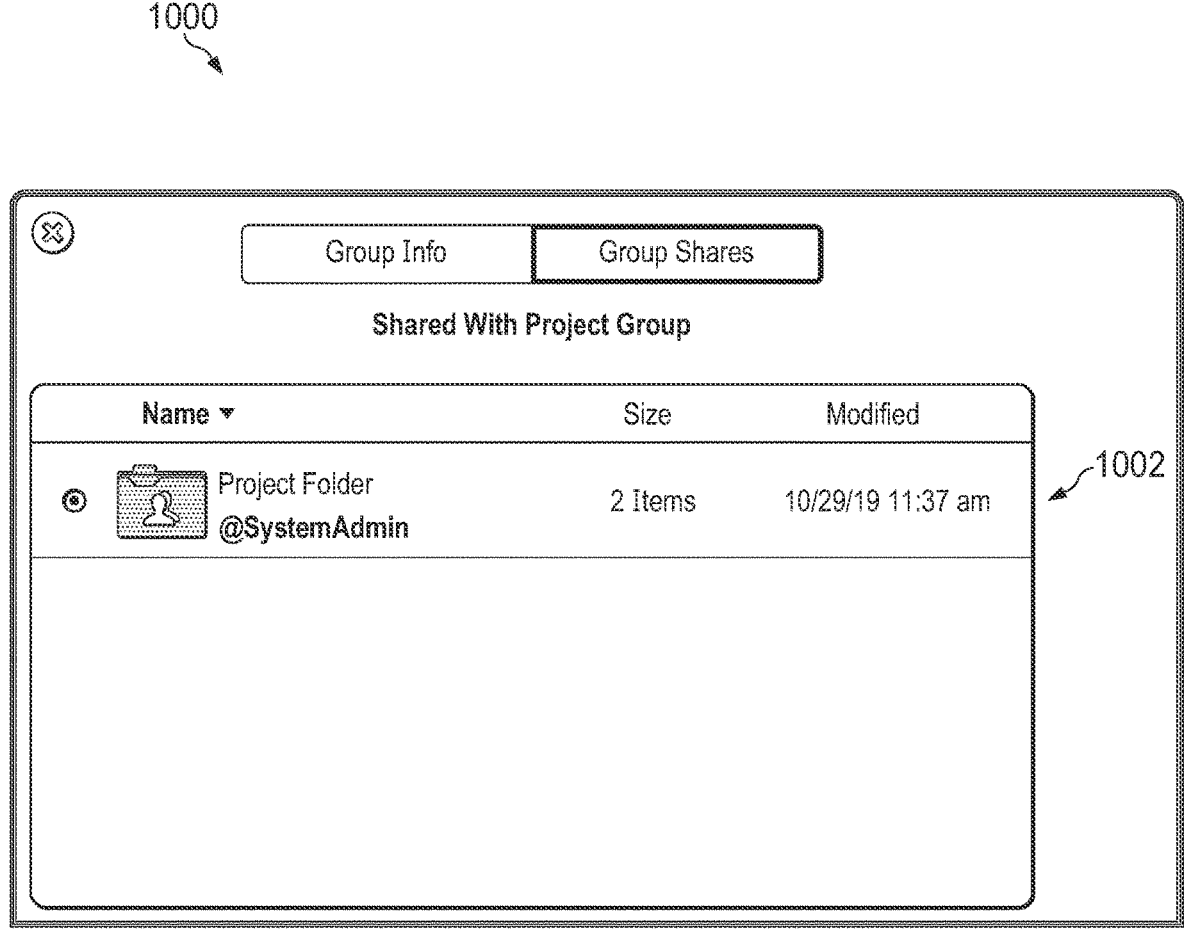
FIG. 10 illustrates one embodiment of a Group Shares user interface.

Responsive to the user selecting a user group for editing, the user is presented with a group administration user interface. FIG. 9, for example, illustrates one embodiment of a content management service group administration interface 900. In this example, Manger One has selected Project Group 804 from the interface of FIG. 8. The user interface provides controls to allow Manager One to add and remove users from the user group and designate users as Group Administrators 902. In some embodiments, an external user who is a Group Administrator is limited to adding users who are members of the same tenant as that external user. That is, in some embodiments, Manager One is limited to adding users from "CompanyB" to the user group. In other embodiments, a Group Administrator may add users from other tenants or unaffiliated users to the user group.

In the illustrated example of FIG. 9, Manager One has added Manager Two as a Group Administrator and the users External Three and External Two as members of the Project Group. In this example, each of Manager Two, External Three and External Two are considered external members of the user group because they are not members of the tenant under which the group was created. Based on their inclusion in Project Group and the sharing of Project Folder with Project Group, Manager Two, External Three and External Two will have a Viewer Level of access to Project Folder.

In some embodiments, a Group Administrator has other privileges with respect to a user group. As one example, a Group Administrator may view a list of folders or files that have been shared with the user group. For example, by clicking on "Group Shares" 904 in the example interface 900 of FIG. 9, Manager One is presented with a list of folders 1002 shared with Project Group, as illustrated in the example user interface 1000 of FIG. 10.

According to one embodiment, the content management application applies an additive permissions scheme in which a user may be granted permissions to a file or folder through multiple mechanisms and the user is granted a level of access based on the combination of permissions. For example, in the example above, Manager One is granted a Viewer level of access to Project Folder through the Project Group. In addition, System Admin could share Project Folder with Manager One as an individual user and assign Manager One a Collaborator level of access. In this case, Manager One would have with respect Project Folder the higher level of access provided by the Collaborator role.

In the foregoing examples, Project Group was created by a user. In some embodiments, the content management application can import user groups for a tenant, including groups that have external members, from various sources, such as a tenant's active directory, assign group administrators to the imported groups and share files or folders with the imported groups.

As can be appreciated, embodiments described herein provide a more flexible scheme for user group administration in a multitenant environment. A tenant can define a user group that includes external users and designate an external member as a group administrator. The group administrator has privileges to add and remove members to the user group. The tenant can further share a portion of its data with the user group, specifying a level of access to the data by the user group. Members of the user group can access the data according to the level of access assigned to the user group for the data and the group administrator can add group members/group administrators to and remove group members/group administrators from the user group. Thus, for example, a manufacturer can define a user group that includes a trusted employee of a repair contractor as a group administrator, share a folder containing internal service manuals to the user group, and assign a level access for the user group to the shared folder. Members of the user group can access the service manuals according to the specified level of access for the user group. The group administrator, who is the trusted employee of the repair contractor, can add and remove service specialists from the user group as needed. Thus, the user group can be updated more quickly to better reflect the individuals who should have access to the service manuals.

Figure 11:
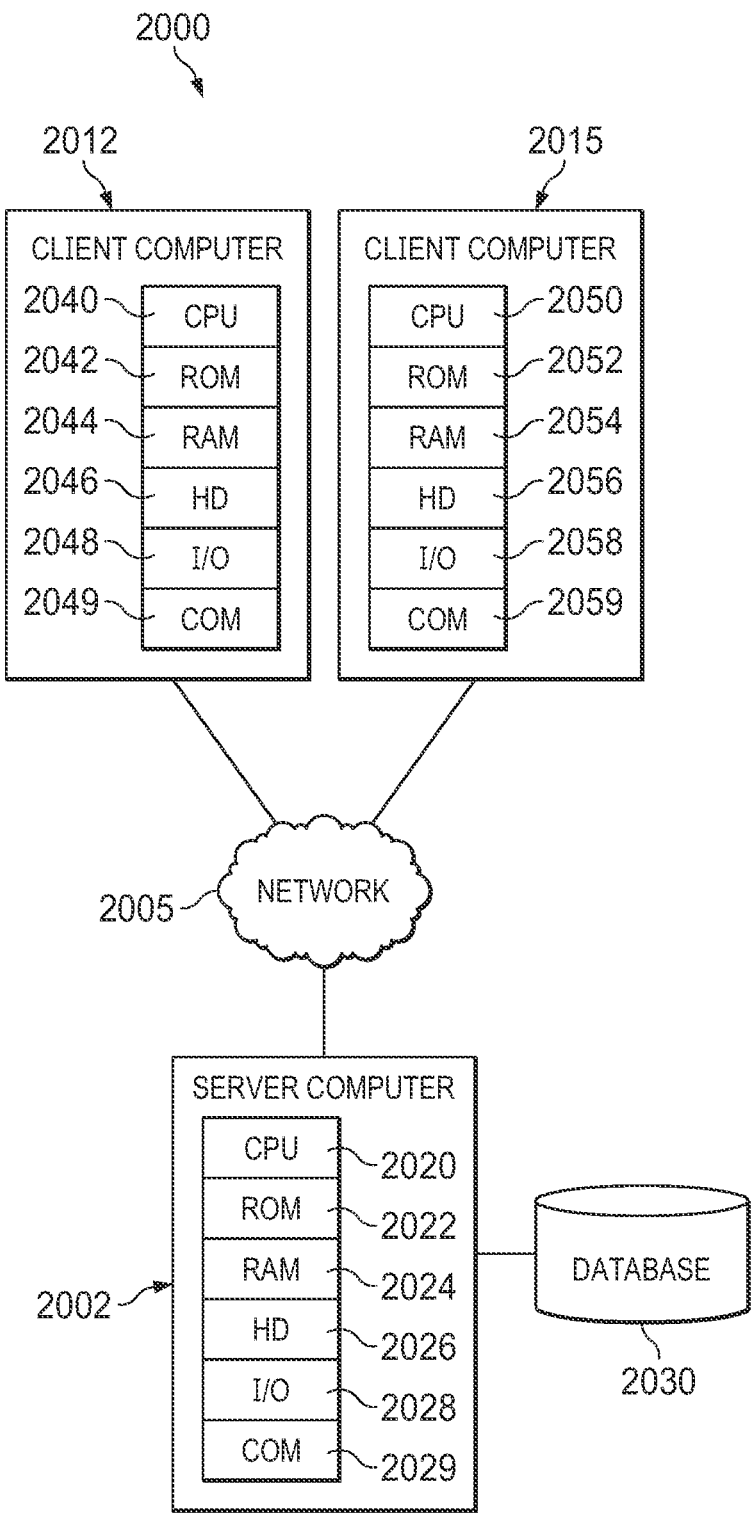
FIG. 11 is a diagrammatic representation of one embodiment of a distributed network environment.

FIG. 11 depicts a diagrammatic representation of a distributed network computing environment where embodiments disclosed herein can be implemented. In the example illustrated, network computing environment 2000 includes network 2005 that can be bi-directionally coupled to client computers 2012, 2015 and server computer 2002. Network 2005 may represent a combination of wired and wireless networks that network computing environment 2000 may utilize for various types of network communications known to those skilled in the art. For the purpose of illustration, a single system is shown for each of computer 2002, 2012, and 2015. However, each of computer 2002, 2012 and 2015 may comprise a plurality of computers (not shown) interconnected to each other over network 2005. For example, a plurality of computers 2002, a plurality of computers 2012 and a plurality of computers 2015 may be coupled to network 2005. Computers 2012, 2015 may include data processing systems for communicating with computer 2002.

Server computer 2002 can include central processing unit ("CPU") 2020, read-only memory ("ROM") 2022, random access memory ("RAM") 2024, hard drive ("HD") or storage memory 2026, input/output device(s) ("I/O") 2028 and communication interface 2029. I/O 2028 can include a keyboard, monitor, printer, electronic pointing device (e.g., mouse, trackball, stylus, etc.), or the like. Communications interface may include a communications interface, such as a network interface card, to interface with network 2005. Computer 2002 may include one or more backend systems configured for providing a variety of services to computers 2012, 2015 over network 2005. These services may utilize data stored in data store 2030. According to one embodiment, server computer 2002 may include computer executable instructions stored on a non-transitory computer readable medium coupled to a processor. The computer executable instructions of server 2002 may be executable to provide a content management application (e.g., content management application 104) to provide a multitenant content management service that supports external users in user groups and manage an object data store in which folders and files are managed as objects.

Computer 2012 can comprise CPU 2040, ROM 2042, RAM 2044, HD 2046, I/O 2048 and communications interface 2049. I/O 2048 can include a keyboard, monitor, printer, electronic pointing device (e.g., mouse, trackball, stylus, etc.), or the like. Communications interface 2049 may include a communications interface, such as a network interface card, to interface with network 2005. Computer 2015 may similarly include CPU 2050, ROM 2052, RAM 2054, HD 2056, I/O 2058 and communications interface 2059. According to one embodiment, client computers 2012, 2012 client applications (e.g., client applications 120) to interact with the content management application.

Each of the computers in FIG. 11 may have more than one CPU, ROM, RAM, HD, I/O, or other hardware components. For the sake of brevity, each computer is illustrated as having one of each of the hardware components, even if more than one is used. Each of computers 2002, 2012 and 2015 is an example of a data processing system. ROM 2022, 2042, and 2052; RAM 2024, 2044, and 2054; HD 2026, 2046, and 2056; and data store 2030 can include media that can be read by CPU 2020, 2040, or 2050. These memories may be internal or external to computers 2002, 2012, or 2015.

Portions of the methods described herein may be implemented in suitable software code that may reside within ROM 2022, 2042, or 2052; RAM 2024, 2044, or 2054; or HD 2026, 2046, or 2056. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method for group administration in a multi-tenant environment, the method comprising:
   receiving, by a content management system executing on a processor, a first definition from a member of a first tenant, the first definition indicating, for a user group, a group administrator who is not a member of the first tenant;
   updating, by the content management system, a user group object to indicate the group administrator per the first definition, the user group object stored in a storage layer associated with the first tenant;
   responsive to a member of a second tenant interacting with a content management service provided by the content management system, determining, by the content management system, whether the member of the second tenant is the group administrator of the user group associated with the first tenant;
   responsive to determining that the member of the second tenant is the group administrator of the user group associated with the first tenant, providing, by the content management system, a multitenant user interface to the member of the second tenant, the multitenant user interface including administrator functions applicable to the user group associated with the first tenant, wherein one or more external users are added to the user group in response to an initiation of the administrator functions; and
   responsive to any administrator function being applied, through the multitenant user interface, to the user group associated with the first tenant by the member of the second tenant, updating, by the content management system, the user group object stored in the storage layer associated with the first tenant.

2. The method according to claim 1, further comprising:
   receiving a second definition from a member of the tenant, the second definition indicating a file or folder to be shared with the user group and a level of access for the file or folder.

3. The method according to claim 2, further comprising:
   updating the user group object to reference the file or folder; or
   setting permissions for the user group on the file or folder per the second definition.

4. The method according to claim 1, wherein the administrator functions comprise removing a member from the user group or adding a member to the user group.

5. The method according to claim 1, wherein the group administrator who is not a member of the first tenant is a registered user of the content management service.

6. The method according to claim 1, wherein the group administrator who is not a member of the first tenant is not a registered user of the content management service.

7. The method according to claim 6, further comprising:
   contacting, using information provided by the member of the first tenant, the group administrator who is not a member of the first tenant to register with the content management service.

8. A content management system, comprising:
   a processor;
   a non-transitory computer-readable medium; and
   instructions stored on the non-transitory computer-readable medium and translatable by the processor for:

receiving a first definition from a member of a first tenant, the first definition indicating, for a user group, a group administrator who is not a member of the first tenant;

updating a user group object to indicate the group administrator per the first definition, the user group object stored in a storage layer associated with the first tenant;

responsive to a member of a second tenant interacting with a content management service provided by the content management system, determining whether the member of the second tenant is the group administrator of the user group associated with the first tenant;

responsive to determining that the member of the second tenant is the group administrator of the user group associated with the first tenant, providing a multitenant user interface to the member of the second tenant, the multitenant user interface including administrator functions applicable to the user group associated with the first tenant, wherein one or more external users are added to the user group in response to an initiation of the administrator functions; and responsive to any administrator function being applied, through the multitenant user interface, to the user group associated with the first tenant by the member of the second tenant, updating the user group object stored in the storage layer associated with the first tenant.

9. The content management system of claim 8, wherein the instructions are further translatable by the processor for:
receiving a second definition from a member of the tenant, the second definition indicating a file or folder to be shared with the user group and a level of access for the file or folder.

10. The content management system of claim 9, wherein the instructions are further translatable by the processor for:
updating the user group object to reference the file or folder; or
setting permissions for the user group on the file or folder per the second definition.

11. The content management system of claim 8, wherein the administrator functions comprise removing a member from the user group or adding a member to the user group.

12. The content management system of claim 8, wherein the group administrator who is not a member of the first tenant is a registered user of the content management service.

13. The content management system of claim 8, wherein the group administrator who is not a member of the first tenant is not a registered user of the content management service.

14. The content management system of claim 13, wherein the instructions are further translatable by the processor for:
contacting, using information provided by the member of the first tenant, the group administrator who is not a member of the first tenant to register with the content management service.

15. A computer program product comprising a non-transitory computer-readable medium storing instructions translatable by a processor of a content management system for:
receiving a first definition from a member of a first tenant, the first definition indicating, for a user group, a group administrator who is not a member of the first tenant;
updating a user group object to indicate the group administrator per the first definition, the user group object stored in a storage layer associated with the first tenant;
responsive to a member of a second tenant interacting with a content management service provided by the content management system, determining whether the member of the second tenant is the group administrator of the user group associated with the first tenant;
responsive to determining that the member of the second tenant is the group administrator of the user group associated with the first tenant, providing a multitenant user interface to the member of the second tenant, the multitenant user interface including administrator functions applicable to the user group associated with the first tenant, wherein one or more external users are added to the user group in response to an initiation of the administrator functions; and
responsive to any administrator function being applied, through the multitenant user interface, to the user group associated with the first tenant by the member of the second tenant, updating the user group object stored in the storage layer associated with the first tenant.

16. The computer program product of claim 15, wherein the instructions are further translatable by the processor for:
receiving a second definition from a member of the tenant, the second definition indicating a file or folder to be shared with the user group and a level of access for the file or folder.

17. The computer program product of claim 16, wherein the instructions are further translatable by the processor for:
updating the user group object to reference the file or folder; or
setting permissions for the user group on the file or folder per the second definition.

18. The computer program product of claim 15, wherein the administrator functions comprise removing a member from the user group or adding a member to the user group.

19. The computer program product of claim 15, wherein the group administrator who is not a member of the first tenant is a registered user of the content management service.

20. The computer program product of claim 15, wherein the group administrator who is not a member of the first tenant is not a registered user of the content management service and wherein the instructions are further translatable by the processor for:
contacting, using information provided by the member of the first tenant, the group administrator who is not a member of the first tenant to register with the content management service.

\* \* \* \* \*